INVENTORS:
W. R. ORR
J. E. RICHARDSON
E. BASKIR

THEIR ATTORNEY

INVENTORS:
W. R. ORR
J. E. RICHARDSON
E. BASKIR
BY: Theodore E. Bieber
THEIR ATTORNEY

United States Patent Office 3,116,417
Patented Dec. 31, 1963

3,116,417
SCINTILLATION DETECTION IN WELL LOGGING USING FAST AND SLOW PHOSPHORS
William R. Orr, Bellaire, and Jasper E. Richardson and Emanuel Baskir, Houston, Tex., assignors to Shell Oil Company, a corporation of Delaware
Filed Dec. 8, 1959, Ser. No. 858,205
11 Claims. (Cl. 250—71.5)

This invention pertains to well logging and more particularly to a gamma radiation detector of the pair spectrometer type which may be used in nuclear well logging.

As is well known gamma rays are not detected directly but only the secondary effect of their interaction with other materials is detected. More particularly, photomultiplier tubes are utilized to detect the scintillation of light that occurs in a suitably chosen phosphor when a gamma ray interacts with the material of the phosphor. For example, when a gamma ray interacts with an activated cesium iodide phosphor, a scintillation of light is released, the intensity of which is proportional to the energy lost by the gamma ray and which will be detected by the photomultiplier tube. This secondary effect may result from one or all of three different types of phenomena which are involved when a gamma ray interacts with the material of a scintillation phosphor. These three phenomena are known as (1) the photoelectric effect in which a gamma ray interacts with a bound electron in the phosphor and loses all of its energy; some in overcoming the binding energy of the electron and the rest to one electron, (2) the Compton scattering effect in which a gamma ray is scattered by an electron in the phosphor and loses energy to the electron of magnitude depending upon the angle of scattering, and (3) the pair production phenomena in which a gamma ray of more than 1.02 mev. energy interacts with the phosphor and loses all of its energy to form both an electron and a positron with the positron interacting with another electron to produce two .51 mev. gamma rays traveling in opposite direction from the point of interaction of the positron and electron. Various types of detectors have been used in the past to measure the energy of gamma rays such as simple scintillation spectrometers, Compton spectrometers and pair spectrometers. More particularly in each of these detectors measurement of the energy of the gamma rays proceeds by converting the intensity of a scintillation into an electrical impulse possessing some characteristic, e.g. amplitude or duration, related to the intensity of the scintillation, and then measuring that characteristic of the electrical pulse. Relating the pulse to the gamma ray energy requires appropriate calibration, and for certain scintillation spectrometers, this is beset by ambiguity. For example, in a simple scintillation spectrometer, a pulse of a given amplitude may have resulted from a photoelectric interaction and correspond to the full energy of a gamma ray, or it may have resulted from a Compton scattering and correspond to part of the energy of a gamma ray of greater energy. Simple scintillation spectrometers of course detect all secondary effects, and because of this, quantitative analyses become difficult and inaccurate when more than one gamma ray energy is involved. While Compton spectrometers are capable of accurate measurements of the intensity and energy of gamma rays, their operation requires collimated beams in order to achieve a well defined angle. Furthermore, Compton spectrometers become inadequate for gamma ray energies greater than 1 to 2 mev., while for present day logging, the gamma rays of interest have energies between about 1 and 10 mev. A pair spectrometer, on the other hand, requires that the primary gamma ray energy be greater than 1.02 mev., and its efficiency increases with gamma ray energy for energies above this threshold.

The use of pair spectrometers permits one to analyze only those gamma rays which have been absorbed by the pair production process. More particularly, if one uses a pair spectrometer all types of phenomena other than the pair production phenomena will be eliminated and thus most pulses which complicate subsequent analysis of the pulses produced by the gamma rays are removed. More particularly, by eliminating the pulses produced by Compton scattering as well as by the photoelectric phenomenon one greatly reduces the ambiguity referred to above. This results in clearly defined peaks in the pulse height distribution which have a simple and known relation to the energy of the gamma rays. By knowing the location and relative intensity of these characteristic peaks one can determine the approximate chemical composition of the material in which the gamma rays originated. For example, if one irradiates the formation surrounding the borehole with neutrons and then analyzes the gamma rays produced by the interaction of the neutrons with the formation one can determine the approximate chemical composition of the formation by inspection of the peaks and their intensities. Such a determination is not possible if one merely detects the number of returning gamma rays or utilizes a simple scintillation spectrometer for measuring the energy of the gamma rays since the well defined characteristic peaks either do not appear or are beset with ambiguities in such analyses of gamma rays.

In the past, all pair spectrometers have utilized three scintillation phosphors which were disposed in a side-by-side relationship with three photomultipliers arranged so that each phosphor was viewed by a separate photomultiplier tube. Thus, if a gamma ray having the required energy interacted with the central phosphor it would produce two additional gamma rays which could interact with the adjacent side phosphors to produce scintillations that are detectable by the two corresponding photomultipliers. For example, if the three photomultipliers were disposed in the form of a T each viewing one phosphor, by using the pulse produced by the two side photomultipliers to actuate a coincidence circuit one could activate suitable analyzing instruments to analyze the pulse produced by the third or central photomultiplier tube. The pulse produced by the third photomultiplier tube would be caused in this case by the gamma ray which produced the pair of gamma rays detected by the two side photomultipliers and is related in a simple manner to the primary gamma ray energy. Such pair spectrometers generally require relatively thick lead barriers to shield the two side phosphors from the primary gamma rays in order to reduce the possibility of chance coincidence caused by the primary gamma rays.

From the above description of presently available pair spectrometers it can be readily appreciated that the physical dimensions of such a T arrangement would make it impossible to incorporate it in a logging instrument which could be lowered into a borehole. For example, it would be impossible to use commercially available photomultiplier tubes and dispose them in a T arrangement without having the overall dimensions of such an arrangement exceed the diameter of most boreholes. Thus, while it has been suggested to use pair spectrometers in which the photomultiplier tubes are disposed in a T arrangement it has been considered a physical impossibility to construct such a device for logging purposes using presently available components. This is especially true when one considers that relatively thick lead shielding on the order of two inches or more is required in order to decrease the possibility of change coincidence in a pair spectrometer.

Accordingly, it is the principal object of this invention to provide a novel construction of a pair spectrometer which makes possible the use of a pair spectrometer in a well logging instrument.

A further object of this invention is to provide a novel construction of a pair spectrometer which requires only two photomultiplier tubes disposed in a straight line in order that the spectrometer may be utilized in well logging instruments.

A still further object of this invention is to provide a unique pair spectrometer which utilizes three scintillation phosphors and two photomultiplier tubes all disposed in a straight line in order that the instrument may be utilized in a well logging instrument.

A still further object of this invention is to provide a pair spectrometer utilizing three phosphors and two photomultiplier tubes in which one of the photomultiplier tubes views two of the phosphors and the second tube views the third phosphor.

A still further object of this invention is to provide a pair spectrometer utilizing three scintillation phosphors and two photomultiplier tubes disposed with one photomultiplier tube viewing two phosphors and the other photomultiplier tube viewing the third phosphor with a novel circuit for separating the pulses of the photomultiplier tube which views the two phosphors.

The above objects and advantages of this invention are achieved by producing a pair spectrometer which utilizes two similar phosphors having a relatively fast decay time, such as plastic phosphors, and one phosphor having a relatively slow decay time, such as activated cesium iodide. One of the plastic phosphors is disposed on the end of one photomultiplier tube while the other plastic phosphor and the CsI phosphor are disposed on the end of a second photomultiplier tube. Suitable means are provided for shielding the phosphors disposed on the two photomultiplier tubes from each other in order that light produced in the phosphor or phosphors on one photomultiplier tube will not activate the phosphor on the other photomultiplier tube. The pulses produced in the photomultiplier tube viewing two phosphors are removed from both its anode and its last dynode and passed through suitable circuits in order to separate the portion of the pulse due to the plastic phosphor from the portion of the pulse due to the CsI phosphor. After the pulses are separated the pulses due to the fast decay plastic phosphors are utilized to trigger a coincidence circuit which in turn activates a pulse analyzing circuit to analyze the pulse produced by the CsI phosphor. While a fast decay phosphor is used for the photomultiplier tube which views a single phosphor a slow decaying phosphor could also be used in conjunction with a pulse shaping circuit.

The above objects and advantages of this invention will be more easily understood by those skilled in the art when taken in conjunction with the attached drawings in which.

Figures 1, 2:
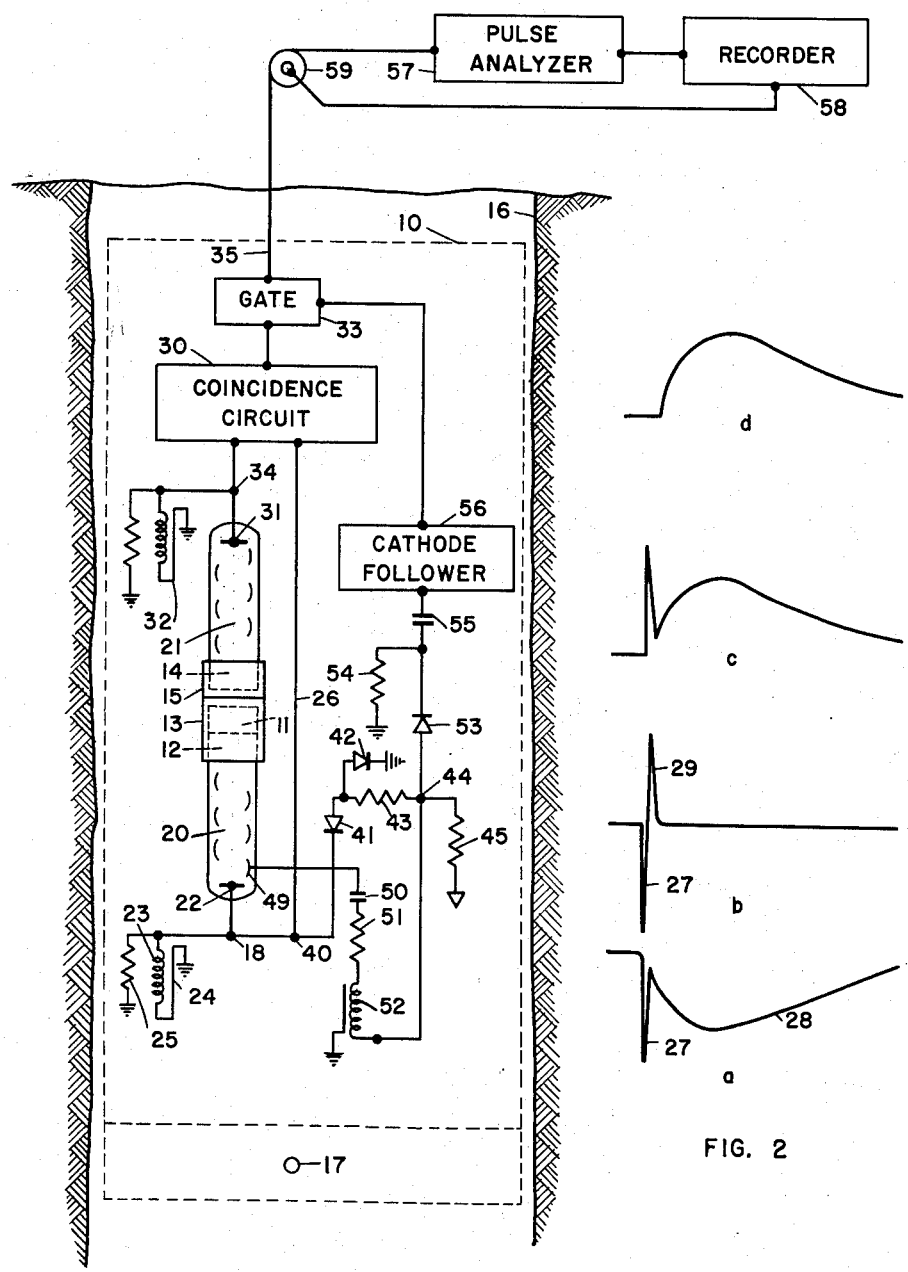
FIGURE 1 is a schematic view of an instrument constructed according to this invention with portions thereof shown in block diagram form.
FIGURE 2 is a series of curves showing the shape of the various voltage pulses produced in the various phosphors and other portions of the circuit shown in FIGURE 1.

Referring now to FIGURE 1 there is shown an instrument constructed according to this invention which is adapted to be lowered into a borehole 16. More particularly, the instrument is enclosed within a suitable housing diagrammatically illustrated by the dotted line 10 which may be secured to a cable 35 for lowering in the borehole. No particular construction for this housing is given since various types are well known to those skilled in the art. A suitable source of neutrons 17 is disposed in the lower end of the housing 10 and shielded from the remainder of the instrument by any desired material such as lead or the like. The instrument itself consists of two phosphors 11 and 12 which are enclosed within a light-tight shield 13 and a third phosphor 14 which is enclosed within a light-tight shield 15. The two phosphors 11 and 12 are viewed by a photomultiplier tube 20 while the phosphor 14 is viewed by a photomultiplier tube 21. The phosphor 11 may be any well known type of scintillation phosphor having a relatively slow decay time on the order of 1,000 millimicroseconds, suitable examples being activated KI, CsI and NaI phosphors. The phosphors 12 and 14 are scintillation phosphors having relatively fast decay times on the order of 10 millimicroseconds, suitable examples being stilbene, diphenylacetylene, or the various synthetic plastic or liquid phosphors presently available for use on scintillation counters. Where desirable the fast decay phosphors 12 and 14 may be surrounded by lead shields adapted to fit between the surfaces of the phosphors and the housing to substantially eliminate the possibility of chance coincidences.

The light-tight shields 13 and 15 should be relatively transparent to gamma rays but impervious to visible light, suitable shields being formed of relatively thin aluminum or the like.

From the above description it can be appreciated that the three phosphors and the two photomultiplier tubes are all disposed along a single axis and thus it is a relatively simple matter to construct an instrument having a small overall diameter which may be easily lowered into even the smallest boreholes. When such an instrument is lowered into a borehole a gamma ray having an energy level of more than 1.02 mev. which strikes the center phosphor 11 may produce both an electron and a positron. As explained above, the positron will combine almost instantaneously with a second electron and their total mass energy will be converted into two .51 mev. gamma rays which travel in opposite directions from the point of conversion. These two gamma rays will be detected simultaneously in the two phosphors 12 and 14 which view the phosphor 11 from opposite sides. Both the original gamma ray detected by the phosphor 11 and the additional gamma ray detected by the phosphor 12 will produce a pulse in the photomultiplier tube 20, a portion of which will be due to the phosphor 11 and another portion being the result of the phosphor 12. The photomultiplier tube 21 will also produce a pulse but it of course will be due solely to the scintillation of the phosphor 14.

The pulse produced in the photomultiplier tube 20 is removed at the anode 22 and passed through a circuit which removes the portion of the pulse resulting from the phosphor 11. This circuit consists of a shorted delay line 23 which will both delay the pulse and invert it. The delayed and inverted pulse is then combined at a point 18 with the original pulse from the anode 22. The delay line 23 may consist of a short section of shielded cable which has its shield 24 connected to the conductor at one end and grounded at the other. A grounded resistance 25 is disposed in parallel with the delay line 23 in order to properly terminate the delay line and prevent reflections. The combined signal from the junction point 18 is coupled to a coincidence circuit 30 by means of a lead 26. Also coupled to the coincidence circuit 30 is the pulse from the photomultiplier tube 21 resulting from interaction of the second gamma ray with the phosphor 14. This pulse is likewise taken from the anode 31 of the photomultiplier 21 and passed through a shorted delay line 32 having the same chracteristics as the shorted delay line 23. It is necessary to pass the signal from the photomultiplier 21 through a shorted delay line to obtain a signal similar to that obtained from the photomultiplier 20.

Referring now to FIGURE 2(a), there is shown a composite pulse similar to the one that appears on the anode of the tube 20 when a gamma ray is detected by the pair spectrometer. From an inspection of this curve it is seen that the portion 27 which has a relatively narrow time width is due to the fast decaying phosphor 12 while the portion 28 having a relatively large time width is due to the slow decaying phosphor 11. When this signal is passed through the shorted delay line 23 it will be slightly delayed and in addition inverted. Thus, when the signal from the delay line and the original signal are combined at the junction 18 a composite signal such as shown in FIGURE 2(b) will be produced. This signal will consist of the original portion of the pulse 27 and a reflection of this pulse 29. The slow decaying portion 28 of the original pulse will be substantially cancelled by the reflection of the slow decay pulse. It is seen that the delay line 23 should delay the original pulse for a time equal to or somewhat greater than the time width of the pulse 27 due to the fast decaying phosphor. As explained above, the fast decaying phosphor should have a decay time on the order of 10 millimicroseconds or less and thus the delay line 23 should have a delay time on the order of this same magnitude. The pulse from the anode 31 of the photomultiplier 21 when combined with the pulse from the delay line 32 at the junction 34 will have substantially the same wave form as shown in FIGURE 2(b). Of course, it is not necessary to cancel any slow decaying portion of the pulse from the pulse which appears on the anode 31 since the tube 21 does not view the slow decaying phosphor 11, but the pulse from the anode 31 is passed through the delay line and inverted in order that two positive pulses having substantially the same wave form and disposed in the same time relationship will be provided for actuating the coincidence circuit 30.

The coincidence circuit 30 is designed so that when it receives a positive pulse from both the anodes 22 and 31 simultaneously it will produce a pulse to open the gate circuit 33. When the gate circuit 33 opens it will pass the slow decaying pulse 28 from the photomultiplier 20 to the surface of the well over a logging cable 35. The slow decaying pulse 28 will be separated from the fast decaying pulse 27 by means of a circuit described below. At the surface the slow decaying pulse will be passed through a pulse analyzer 57 which will determine the energy level of the gamma rays which produced the pulses and accumulate the number of pulses produced by gamma rays of various energy levels. When the logging cable 35 has great length, it may be desirable that the pulse height analyzer 57 be included in housing 10. This is necessary in order to achieve pulse height separation before they are distorted by the cable. This information will be recorded on a recorder 58 in the form of a graph, continuous curve or the like. When the information is recorded in the form of a continuous curve, or curves, it is customary to synchronize the curve with the location of the detector in the well bore which may be easily done through use of a selsyn unit 59 or the like. By analyzing the record one can determine the location and the intensity of the various peaks and from this information determine the chemical composition of the material which produced the gamma rays.

The slow decaying portion 28 of the pulse from the photomultiplier tube 20 is separated from the fast decaying portion 27 by means of the circuit shown in FIGURE 1. This circuit utilizes the pulse shown in FIGURE 2(b) which is used for operating the coincidence circuit 30 and couples it to the pulse from the last dynode 49 of tube 20 at a junction point 44 through diode 41 and resistance 43. The diode 41 is disposed so that it will pass only the negative portion of the pulse while resistance 43 and diode 42 are a decoupling network to prevent positive pulses from passing through diode 41 from junction point 44. The pulse which appears on a dynode near the end of the tube, such as the last dynode 49 of the tube 20 is passed through a coupling condenser 50, an attenuating resistance 51 and a time delay 52 which may be a coaxial cable. The time delay of the circuit should be chosen so that it equals the time required for electrons to pass from the last dynode 49 to the anode 22 of the tube 20. Thus, the signal from the dynode will arrive at the junction point 44 at substantially the same time that the signal from the anode 22 arrives at the junction point. The resistance 51 should be chosen so that the signal from the anode 22 has substantially the same amplitude as the signal from dynode 49. The signal from the dynode 49 will have substantially the same wave form as shown in FIGURE 2(c) while the signal from the anode will consist of only the negative portion of the signal shown in FIGURE 2(b). Thus, when these two signals are algebraically combined at the junction point 44 the fast decaying portion of the signal shown in FIGURE 2(c) will be cancelled by the negative portion of the signal shown in FIGURE 2(d) and only the slow decaying portion of the signal shown in FIGURE 2(d) transmitted beyond the junction point 44. The signal from the junction point 44 is passed to a diode 53 which is disposed to pass only positive signal in order to remove any negative signal which remains in the pulse. A resistance 54 returns the diode to ground potential after the pulse and a condenser 55 couples the pulse to a cathode follower 56. The signal from cathode follower 56 then passes through the gate 33 if a signal is received simultaneously from the coincidence circuit 30. The above circuit is described in greater detail and claimed in a copending application of J. E. Richardson and W. R. Orr, entitled "Pulse Shaping Circuit," filed December 8, 1959, Serial No. 858,204.

Figure 3:
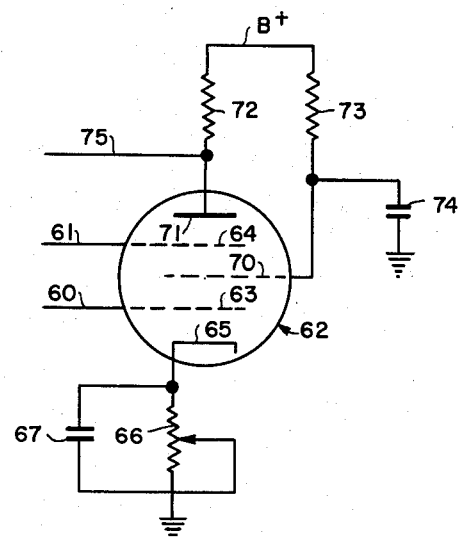
FIGURE 3 is a circuit diagram of a coincidence circuit suitable for use in the instrument shown in FIGURE 1; and, FIGURE 4 shows a second circuit for separating the pulses produced in the two phosphors which are viewed by a single photomultiplier tube.

Referring now to FIGURE 3, there is shown a circuit suitable for use as the coincidence circuit 30 shown in FIGURE 1. The coincidence circuit 30 uses a pentode tube 62 having two control grids 63 and 64. The tube should be chosen so that a positive input signal is required for both the control grids 63 and 64 before the tube will conduct. Thus, the fast decaying pulse from the two phosphors 12 and 14 can be supplied to the two inputs 60 and 61 of the tube to cause it to conduct if the pulses are in coincidence. The cathode 65 of the tube is connected to ground through a potentiometer 66 which is bypassed by a capacitor 67 while the plate 71 is connected to a B plus power supply through a suitable load resistor 72. The accelerating electrode 70 is also coupled to the power supply through a resistor 73 and to ground through a capacitor 74.

From the above description it can be seen that if two positive pulses are supplied to the inputs 60 and 61 simultaneously the tube will conduct and thus a pulse appears at the output 75 which may be used to operate gate circuit 33 shown in FIGURE 1.

No power supply is shown in FIGURE 1 for the photomultiplier tubes or the other portions of the circuits but these of course may be supplied from conventional sources such as batteries or by means of the cable 35 from a power supply at the surface or within the instrument.

When the detector described above is lowered into a borehole with a source of neutrons 17 disposed at one end it will detect the gamma rays emitted by the formation surrounding the borehole due to the interaction of the neutrons with the material of the formation. As explained above, only gamma rays which have an energy level which exceeds 1.02 mev. will produce a pair of gamma rays in phosphor 11 which travel in opposite directions. These two gamma rays will be detected simultaneously by the phosphors 12 and 14 and produce fast decaying pulses in the photomultiplier tubes 20 and 21. These pulses are derived at the anodes 22 and 31, respectively, and used to operate a coincidence circuit 30 after they have been delayed and inverted. As explained above, by delaying and inverting the pulses appearing on the anode 22 it is possible to remove from the pulse of tube 20 the slower decay portion which is due to the original gamma ray interacting with the phosphor 11. If a coincidence occurs, the coincidence circuit 30 will open the gate 33 and pass the pulse from the cathode follower 56 to the surface. This pulse will be only the slow decaying portion of the pulse produced in the photomultiplier tube 20 due to the phosphor 11. It is easier of course to analyze a slow decaying pulse for the various gamma ray energy levels than it is a fast decaying pulse and thus preferably to use a slow decay phosphor 11 to detect the original gamma ray. While it is preferable to analyze a slowly decaying pulse it is difficult to use a slow decaying pulse in a coincidence circuit and insure that the circuit will only operate on a coincidence. Thus the probability of a chance coincidence due to original gamma rays striking the phosphors 12 and 14 is greatly increased if slow decaying phosphors are used. For example, considering the decay time of the above-described phosphor 11 if the pulse from phosphors similar to 11 were used for operating the coincidence circuit 30 the probability of a chance coincidence would be increased by a factor greater than 100 over that when fast decaying phosphors such as 12 and 14 are utilized for operating the circuit.

Figure 4:
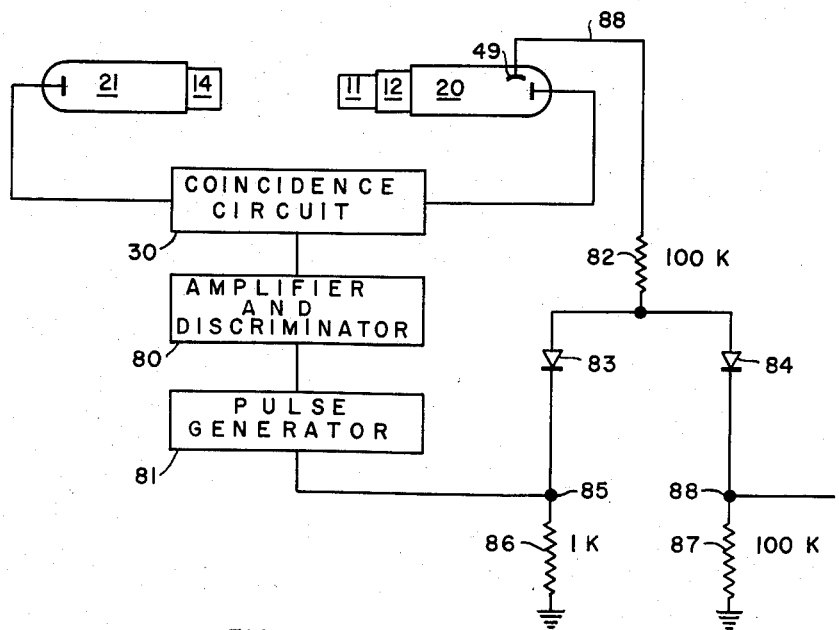

Referring now to FIGURE 4, there is shown a second means by which the fast decaying portion of the pulse may be removed from the pulse produced by the photomultiplier tube 20. In this figure, circuits and elements which produce the same results as those shown in FIGURE 1 bear the same numbers. The coincidence circuit operates in the same manner as that described above with reference to FIGURE 1. The pulse from the coincidence circuit 30 is passed through an amplifier and discriminator 80 which in addition to amplifying the pulse discriminates in favor of pulses produced by .51 mev. gamma rays. The signal from the amplifier 80 is passed through a pulse generator 81 which generates a pulse having a relatively wide band width and of a certain amplitude as will be explained below. The signal from the last dynode 49 of tube 20 is coupled to a resistance 82 by means of a lead 88. The resistance 82 is coupled to two grounded parallel circuits consisting of diodes 83 and 84 and resistance 86 and 87, respectively. The diodes 83 and 84 preferably have fast decay times and very low internal capacitance to prevent their passing spurious high frequency signals to the desired pulses. The signal from the pulse generator is supplied at a junction point 85 which is located between the diode 83 and the resistance 86. The resistances 82 and 87 should have relatively large values while the resistance 86 should have a relatively small value. Suitable values would be 100,000 ohms for resistances 82 and 87 and 1,000 ohms for resistance 86. Thus, in the absence of a pulse from the generator the signal from the dynode 49 of the tube 20 will be divided so that .01 of the signal appears across the leg of the circuit consisting of the diode 84 and the resistance 87 while .99 appears across the resistance 82. If a coincidence occurs and a pulse is produced in the pulse generator 81 this pulse will bias the diode 83 to an off position so that half of the pulse from the dynode 49 will appear across the resistance 82 and half across the leg of the circuit consisting of the diode 84 and resistance 87. Thus, it is seen that on the occurrence of the coincidence signal the signal at the junction point 88 increases in magnitude 50 times.

Furthermore, by proper timing of the pulse generator the output at the junction point 88 can be made to occur just after the portion of the signal from the dynode due to the plastic crystal 12 had decayed to near zero. This means that the narrow pulse due to the plastic crystal 12 is attenuated by a factor of 50 with respect to the broad pulse due to the slow decay crystal 11. Thus the portion of the pulse due to the plastic crystal is effectively stripped from the composite pulse. Of course, if greater or lesser attenuation is wanted the values of the resistances can be changed to provide any desired value.

While the above embodiment describes the use of a fast decaying phosphor on the photomultiplier which views a single phosphor one could also use a slow decaying phosphor and a pulse shaping circuit to provide a narrow time width pulse for the coincidence circuit. The phosphor used preferably has a fast rise time as for example NaI or the like while a suitable pulse shaping circuit is disclosed in the copending application of J. E. Richardson and W. R. Orr, entitled "Pulse Shaping Circuit." The use of a slow decaying crystal would be increase the efficiency of the logging device because of the greater efficiency of most slow decaying phosphors when compared to fast decaying phosphors.

While but one preferred embodiment of this invention has been described in detail with modifications to parts of the circuit, this invention of course is not limited to the particular details described but only to its broad spirit and scope.

We claim as our invention:

1. An apparatus for nuclear logging of boreholes comprising: a housing; a source of neutrons disposed in said housing, first and second scintillation detectors disposed in said housing with the axes of said detectors being substantially parallel with the axis of said housing; said first detector having a composite phosphor formed by a phosphor having a long decay time and a phosphor having a short decay time; said second detector having a single short decay time phosphor; circuit means responsive to the signals of said first and second detectors resulting from said short decay time phosphors to activate a recording circuit, said recording circuit being responsive to the output of said first detector resulting from said long decay time phosphor.

2. An apparatus for nuclear logging of boreholes comprising: a housing; a source of neutrons disposed in said housing; first and second scintillation detectors disposed in said housing with the axes of said detectors being substantially parallel with the axis of said housing; said first detector having a composite phosphor formed by a phosphor having a long decay time and a phosphor having a short decay time; said second detector having a single short decay time phosphor; a coincidence circuit responsive to the output signal of said first and second detectors resulting from the detection by each of said short decay time phosphors of one of a pair of gamma rays resulting from an original gamma ray striking said long decay time phosphor, said coincidence circuit providing a signal indicating the coincidence of the detected gamma rays; the output signal of said coincidence circuit being utilized to control the gating of a pulse analyzer; the output of said first detector resulting from the detection of the original gamma ray by said long decay time phosphor being coupled to said pulse analyzer by said gate circuit.

3. A pair spectrometer for analyzing gamma rays comprising: a first fast decay phosphor and a slow decay phosphor disposed on one end of a first photomultiplier tube; a second fast decay phosphor disposed on the end of a second photomultiplier tube; a coincidence circuit for indicating the coincidence of detection of gamma rays by said first and second fast decay phosphors; a circuit means for removing from the signal of said first photomultiplier signal that portion of the signal resulting from said fast decay phosphor; a gate circuit controlled by said coincidence circuit to pass the signal from said first photomultiplier resulting from said slow decay phosphor to a pulse height analyzer.

4. A pair spectrometer for analyzing gamma rays having sufficient energy to produce a pair of gamma rays when they interact with a scintillation phosphor comprising: a first fast decay phosphor and a slow decay phosphor disposed on a photomultiplier; a second fast decay phosphor disposed on a second photomultiplier; said phosphors and said photomultipliers being disposed along a common axis; a coincidence circuit coupled to said first and second photomultipliers to indicate the coincidence of detection of one of said pair of gamma rays by each of said fast decay phosphors; said coincidence circuit being disposed to control a gate circuit to transmit the pulse resulting from the pair producing gamma ray striking the slow decay phosphor to a pulse analyzing circuit.

5. A pair spectrometer for detecting gamma rays having sufficient energy to produce a pair of gamma rays when they interact with a scintillation phosphor comprising: a first and second photomultiplier tube disposed along a common axis, said first tube disposed to detect scintillations in two phosphors, one of said phosphors having a slow decaying portion and the other of said phosphors having a fast decaying portion, said second tube disposed to detect scintillations in a phosphor having only a fast decaying portion circuit means coupled to said first tube to remove from the signal of said first tube the portion resulting from the scintillation of the slow decay portion of the composite phosphor when a pair producing gamma ray interacts with the composite phosphor; additional circuit means coupled to said first tube to remove from the signal of the first tube the portion resulting from the scintillation of the fast decay portion of the composite phosphor when a pair producing gamma ray interacts with the composite phosphor whereby the signals from said first and second tubes resulting from the scintillation of said fast decay portions may be used to trigger a coincidence circuit to control a pulse analyzing circuit.

6. A pair spectrometer for detecting gamma rays having sufficient energy to produce a pair of gamma rays when they interact with a scintillation phosphor comprising: a first and second photomultiplier tube, said first tube detecting scintillations in a first phosphor having a slow decaying portion and a second phosphor having a fast decaying portion, said second tube detecting scintillations in a third phosphor having only a fast decaying portion; circuit means for separating the pulses in said first tube when a pair producing gamma ray interacts with said first phosphor to produce a sharp pulse for actuating a coincidence circuit in combination with a sharp pulse from the second photomultiplier tube and a wide pulse for analysis.

7. In a well logging instrument, a detector system which is selectively responsive to gamma rays having energies exceeding 1.02 mev., comprising: an assembly of three scintillation phosphors, two having fast decay characteristics and one having slow decay characteristics, and at least two photomultiplier devices responsive to scintillations in said phosphors arranged so that when a gamma ray is absorbed by a pair production interaction in the slow decay phosphor a slow decay electrical pulse is produced at a corresponding amplitude and coincident fast decay electrical pulses are produced by the interactions with the fast decay phosphors of the pair of annihilation rays formed during the pair production process; indicating means adapted to indicate the frequency and amplitude of the slow decay electrical pulses; and circuit means connected to receive the fast decay electrical pulses and to apply the slow decay electrical pulses to the indicating means when a pair of fast decay pulses are coincident.

8. A pair spectrometer for detecting gamma rays having energies exceeding 1.02 mev. comprising: two photomultiplier tubes disposed on a common axis, one of the photomultiplier tubes viewing a single phosphor and the other photomultiplier viewing both a fast decaying phosphor and a slow decaying phosphor, means for indicating a coincidence between pulses in the said one photomultiplier tube and pulses in said other photomultiplier tube resulting from the interaction of a gamma ray with the fast decay phosphor and means for determining a characteristic of the pulse resulting from interaction of a gamma ray with said slow decay phosphor upon the indication of a coincidence.

9. A nuclear well logging instrument comprising: a housing disposed on a cable for lowering into a wellbore; a source of neutrons disposed in the housing; a pair spectrometer disposed in the housing and responsive to gamma rays having energies exceeding 1.02 mev.; said pair spectrometer comprising first and second photomultiplier tubes disposed within said housing with their axes substantially parallel with the axis of said housing, one of said photomultiplier tubes having a single phosphor having a fast response time, the other of said photomultiplier tubes having a composite phosphor formed from two phosphors having materially different response times; means for indicating a coincidence between two signals resulting from a gamma ray being absorbed by a pair production interaction in said spectrometer; gate means responsive to the indication of a coincidence for transmitting the signal resulting from the original gamma ray over said cable to a surface located indicating means.

10. An apparatus for nuclear logging of boreholes comprising: a housing; a source of neutrons disposed in said housing; first and second scintillation detectors disposed in said housing with the axes of said detectors being substantially parallel with the axis of said housing; said first detector having a composite phosphor formed by a phosphor having a slow response time and a phosphor having a fast response time; said second detector having a fast response time phosphor; circuit means responsive to the signals of said first and second detectors resulting from said fast response time phosphors to activate a recording circuit, said recording circuit being responsive to the output of said first detector resulting from said slow response time phosphor.

11. An apparatus for nuclear logging of boreholes comprising: a housing; a source of neutrons disposed in said housing; first and second scintillation detectors disposed in said housing with the axes of said detectors being substantially parallel with the axis of said housing; said first detector having a composite phosphor formed from two phosphors having materially different response times; said second detector having a fast response time phosphor; circuit means responsive to the signal of the said first detector resulting from the phosphor having the fastest response time and the signal from the second detector resulting from the phosphor having the fast response time to activate a recording circuit, said recording circuit being responsive to the output of said first detector resulting from said slow response time phosphor.

References Cited in the file of this patent

UNITED STATES PATENTS

| 2,830,185 | Scherbatskoy | Apr. 8, 1958 |
| 2,910,592 | Armistead | Oct. 27, 1959 |
| 2,937,278 | Copeland | May 17, 1960 |

OTHER REFERENCES

Gamma Ray Measurements With NaI(Tl) Crystals, by Hofstadter et al., Physical Review, vol. 79, No. 2, July 15, 1950, pages 389 to 391.

New Timing Method for Scintillation Events in Fast Coincidence Experiments, by Weinzierl, The Review of Scientific Instruments, vol. 27, No. 4, April 1956, pages 226 to 230.

Today's Pulse Height Analyzers, by Higinbotham, Nucleonics, vol. 14, No. 4, April 1956, pages 61 to 64.